July 19, 1927.
H. W. LORMOR
HANDLE INSERTING MACHINE
Filed Dec. 31, 1923
1,636,642
3 Sheets-Sheet 1
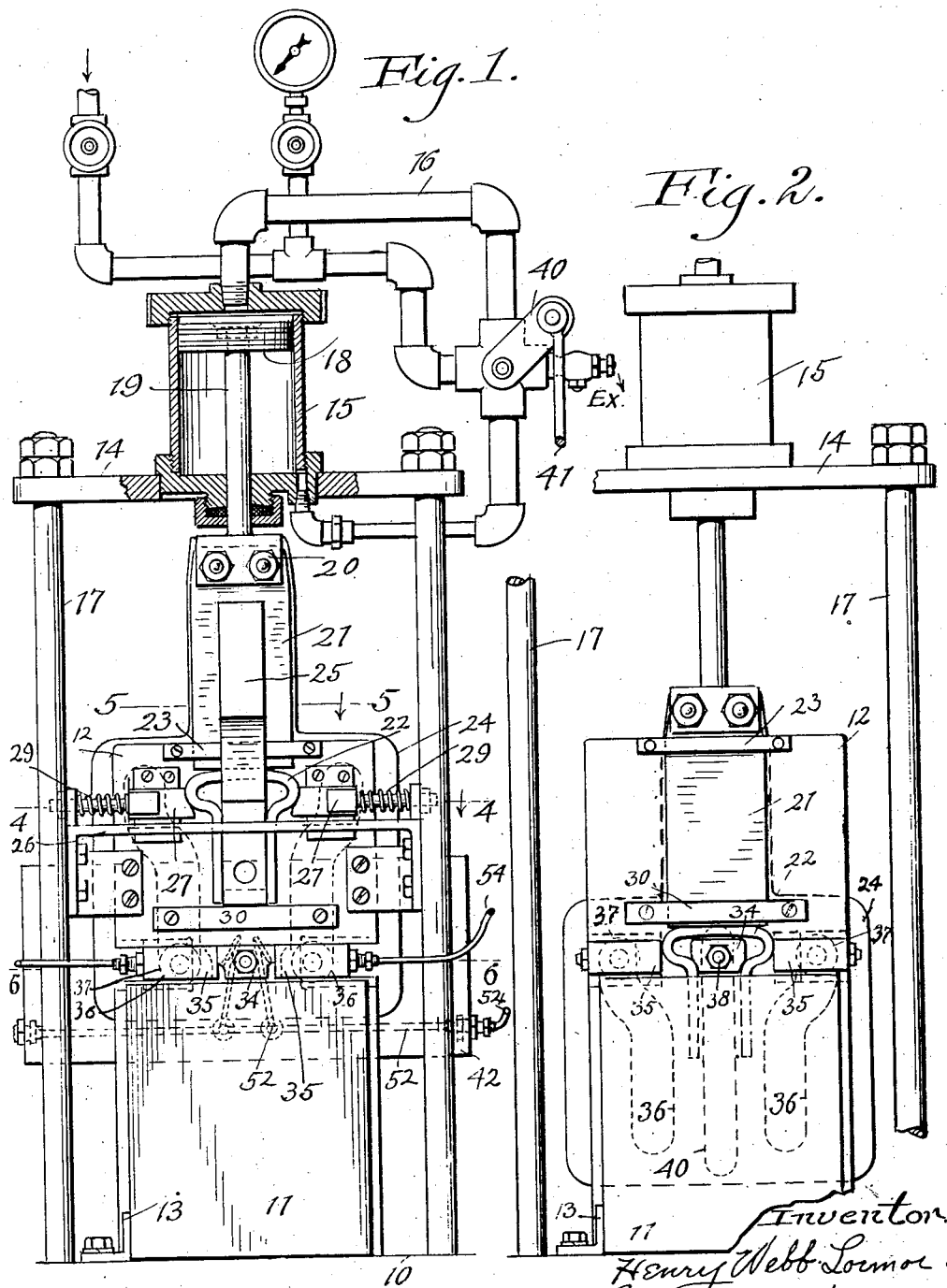

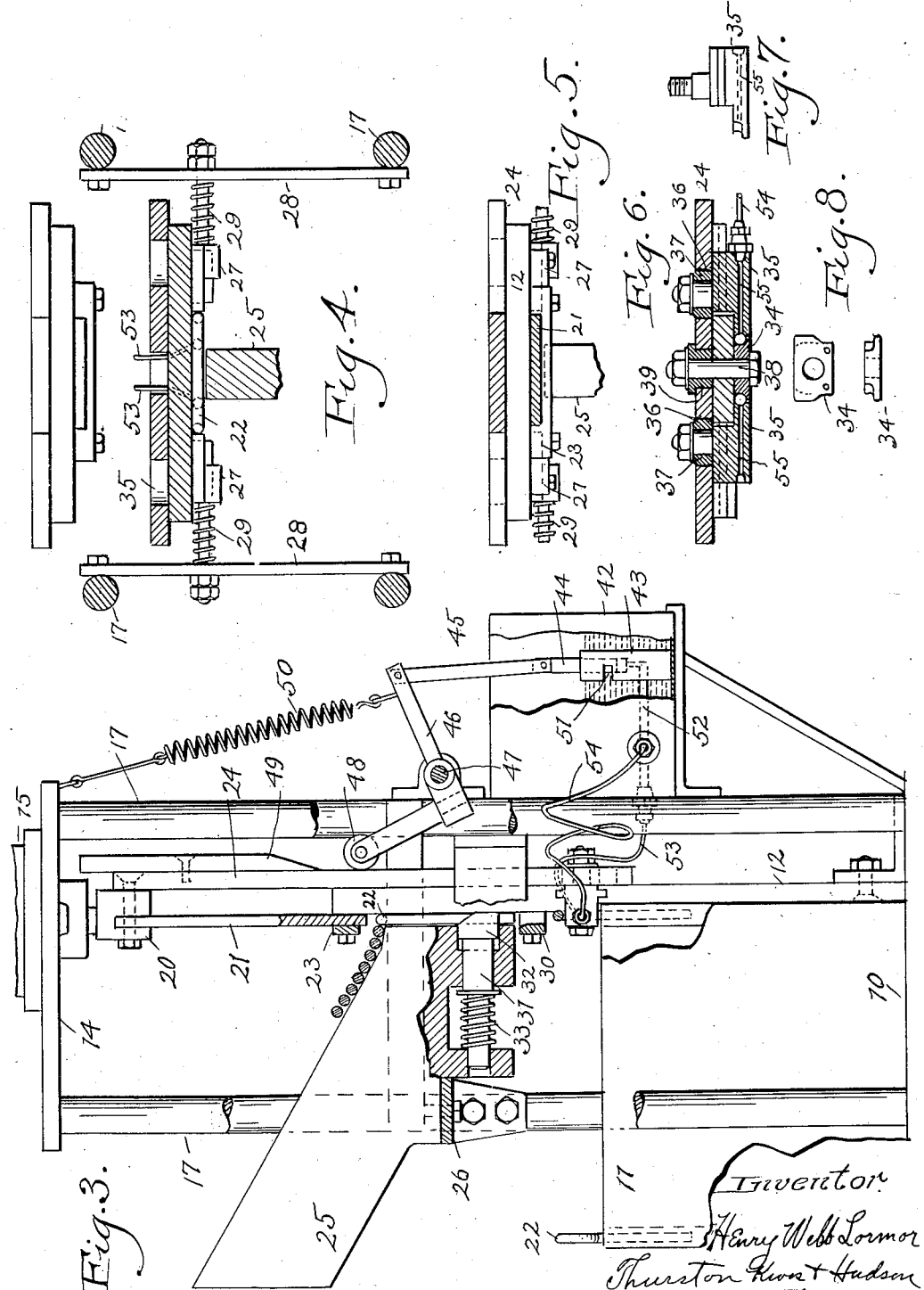

July 19, 1927.

H. W. LORMOR 1,636,642

HANDLE INSERTING MACHINE

Filed Dec. 31, 1923　　　3 Sheets-Sheet 3

Inventor
Henry Webb Lormor.
Thurston Kwis & Hadson
attys

Patented July 19, 1927.

1,636,642

UNITED STATES PATENT OFFICE.

HENRY WEBB LORMOR, OF CLEVELAND, OHIO, ASSIGNOR TO WILLARD STORAGE BATTERY COMPANY, OF CLEVELAND, OHIO, A CORPORATION OF WEST VIRGINIA.

HANDLE-INSERTING MACHINE.

Application filed December 31, 1923. Serial No. 683,843.

This invention relates to a handle inserting machine, and has particular reference to a machine designed to drive or forcibly insert so-called wire handles into openings formed in cases or boxes, such as storage battery cases.

Storage batteries as commonly made at the present time include a box or case the ends of which are provided with handles. Sometimes these handles are made of sheet metal fastened by screws or otherwise to the ends of the cases, and frequently the handles are formed of stiff wire or rods into substantially U-shape, and such handles are fastened in place by having their ends driven tightly into openings bored into the top of the ends of the case. Such handles have parallel portions designed to be driven into the openings and upper hand-hold portions somewhat enlarged.

Heretofore these wire handles have been inserted in the openings by hand and driven downward by a mallet. Obviously, this process requires not only several operations, but a good deal of time, all of which adds to the expense of the completed case, and the results are not always uniform.

The object of the present invention is to provide a machine for inserting these wire handles into cases, which machine will not only do the work effectively, but in much less time than is necessary when the handles are inserted and driven in place by hand, and will drive them downward to a uniform depth.

The machine constituting the subject matter of the present application accomplishes the results in a very desirable manner, and the invention which is involved in the machine may be here briefly summarized as consisting in certain novel details of construction, and combinations and arrangements of parts which will be described in the specification and set forth in the appended claims.

Figure 9:
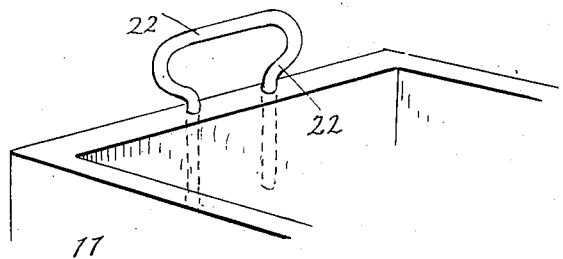
Figure 10:
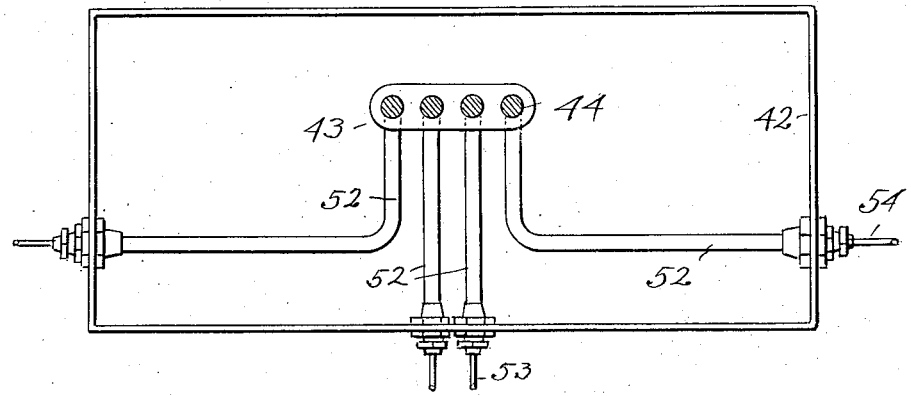

In the accompanying sheets of drawings wherein I have shown the preferred embodiment of the invention, Fig. 1 is a front view of the machine partly in section, showing the battery box or case in position to receive a handle, and showing the handle setting plunger elevated; Fig. 2 is a similar view with parts of the apparatus of Fig. 1 omitted, and showing the plunger lowered; Fig. 3 is a side view of the same, parts being in section; Fig. 4 is a sectional view, the section being taken substantially along the line 4—4 of Fig. 1, looking downward; Fig. 5 is a sectional view substantially along the line 5—5 of Fig. 1, looking downward; Fig. 6 is a sectional view substantially along the line 6—6 of Fig. 1, looking downward; Fig. 7 is a detached or detail view of one of a pair of handle guides employed in guiding the handle as it is driven downward by the plunger; Fig. 8 is a face view and an edge view of a fixed block onto which the upper middle portion of the handle is driven by the plunger; Fig. 9 is a perspective view showing a portion of a case with the handle inserted in the end; and Fig. 10 is a top plan view of an attachment with parts in section, for applying a liquid in the form of waterproof paint to the openings of the case and to the ends of the handle.

The machine includes a bottom member or base 10 on which is adapted to be placed a case or box 11 adapted to receive the handles. When the case is in position to receive a handle at one end it rests against a stationary back plate 12 (see Fig. 3), and against a suitable side abutment here shown as an angle bar 13 (see Figs. 1 and 2). To insert a pair of handles into the ends of the case 11 the operator slides the case inward against the abutments 12 and 13. He then operates the machine to set a handle in one end (see Fig. 3), and then the case is placed end for end in the machine so that the opposite end may receive a handle.

Additionally, the machine includes a top member 14, carrying a vertically disposed cylinder 15 of a fluid pressure motor constituting the source of power for driving the handles in place. Compressed air is preferably employed as the motive fluid, and the piping for supplying compressed air to opposite ends of the cylinder is illustrated in Fig. 1, and may be designated as a whole by the reference character 16.

The top member is suitably secured to the base 10 by columns in the form of rods or bolts 17, the front columns being spaced apart a sufficient distance to permit the insertion of the cases to which the handles are to be applied.

The cylinder 15 contains a piston 18 connected by piston rod 19 to a vertically movable head 20 carrying a vertically disposed plunger in the form of a rather thin blade 21 having a thickness equal to substantially the thickness of the handles which are designated 22. This blade lies flat against and is adapted to slide up and down against the upper part of the back plate 12, as clearly shown in Fig. 3, and is held thereagainst by a guide strip 23. Additionally the head 20 carries a cam plate 24 which rides up and down against the rear face of the back plate 12, the purpose of this cam plate being to actuate certain handle guides to be referred to.

The handles are supplied to a vertically disposed inclined guide or chute 25 which is secured to a cross-piece 26 extending between and secured to the two front columns 17, as clearly shown in Figs. 1 and 3. The handles are placed over this guide so that they may slide down by gravity toward the back plate 12, the lower or inner end of the guide 25 being spaced from this back plate a distance equal substantially to the thickness of one of the handles.

It will be obvious that not only must the holes in the case be spaced apart a distance equal to the space between the parallel lower portions of the handle which are to be driven into these holes, but also that as the handle is driven downward it must be guided in such a manner that the two ends of the handles will be in direct alignment with the holes.

Each time the blade 21 descends it drives the lowermost or innermost handle 22 downward, and each time the blade ascends to the position shown in Fig. 1, the innermost handle slides off the end of the guide 25 into the space between the guide and the back plate 12. When it does this, the enlarged upper part of the handle is temporarily received and supported on the inner curved faces of two slides 27, which are shown in Fig. 1, these slides being guided for lateral movement against the back plate 12, and their outer ends being supported by cross strips 28 extending between the two pairs of columns on either side of the machine (see particularly Fig. 4), for lateral movement. These slides are pressed yieldingly inward by springs 29 shown in Figs. 1 and 4, and when the blade descends and the handle is driven downward, they are cammed outward by the handle, allowing it and the blade to descend between them. As the handle goes downward it passes between the back plate 12 and the inner end of the chute 25 and behind a guide strip 30 secured to the back plate 12, as shown in Figs. 1, 2 and 3. Additionally there is provided in the lower portion of the handle guide or chute 25 (see Fig. 3) a horizontally movable plunger 31 having at its inner or forward end a head 32 and pressed inward by a spring 33. As the handle descends the parallel portions of it straddle the head 32 of this plunger which prevents the handle from tilting, and when the top cross-piece of the handle engages this head it is forced outward, the top of the head being beveled to permit this, and after the handle passes it, the head bears against the lower part of the blade and serves to keep it pressed inward flat against the back plate 12.

The handle passes downward behind the guide strip 30, and just before the lower ends reach the holes in the case, the ends enter guide openings formed by or between the grooved outer sides of a centrally disposed fixed block 34 and the grooved inner ends of two positively actuated slides 35, which are adapted to move in opposite directions toward and from the block 34, and by the co-operation of the block 34 definitely position and centralize the lower ends of the handle with respect to the holes in the case into which the ends are to be driven.

These two slides 35, as above stated, are positively actuated, the positive actuation being obtained by the cam plate 24, which as previously stated, is secured to and moves with the plunger head 20. To accomplish this, the cam plate is provided with two cam grooves 36 which receive rollers 37 carried by the slides (see particularly Figs. 2 and 6), the cam grooves being so formed as to move the guides outwardly just before or at the instant they are engaged by the descending enlarged upper part of the handle. The position that these guides or slides occupy when spread outwardly is illustrated in Fig. 2. The block 34 limits the downward movement of the handles as the upper cross portion of the handle engages the top of the block when driven down by the blade, and this insures that all handles will be driven downward a uniform distance.

This block 34 is fastened to the back plate 12 by a bolt 38 (see particularly Fig. 6), this bolt extending rearwardly beyond the back plate as shown, and carrying a bushing 39 which is received in a vertical and central slot 40 of the cam plate, this slot being best shown in Fig. 2. This bushing therefore serves as a guide for the cam plate which is held against the rear face of the back plate by a flange on the rear end of the bushing 39, as clearly shown in Fig. 6.

Thus it will be seen from the description so far given, that each time the blade ascends a handle slides off the end of the handle delivery guide 25 and is temporarily supported by the laterally movable slides 27, and when the blade descends it engages the top of the handle, forcing it downward along opposite sides of the plunger guide 32 and between the front face of the back plate and the guide strip 30 into the grooves formed on the adjacent faces of the stationary block 34 and the positively actuated slides 35 so that the ends are guided into the openings in the end of the case, these slides 34 moving outward so that the blade may force the top or cross part of the handle against the stationary block or anvil 34. By this means the handle is driven tightly into the case to a definite point or position.

As soon as this operation is completed, the plunger is elevated, the operator reverses the box or case and repeats the operation. The up and down movement of the plunger and cam plate is controlled by a four-way valve designated as a whole by the reference character 40, the same being shown in Fig. 1. This four-way valve is generally operated by the foot of the operator, the valve handle being connected to a rod 41, a portion of which is shown in Fig. 1, which extends downward to a suitable pedal, not shown.

Before the handle is driven into the end of the case as described above, it is desirable that the ends which enter the openings be supplied with a waterproofing paint, and that a quantity of the paint be supplied also to the openings to receive the ends of the handle. The function of this paint is to preserve the wood and also to act as a lubricant to decrease the force necessary to drive the ends of the handle into the openings, which openings are made somewhat smaller than the thickness of the wire or rod of which the handle is formed.

My improved machine not only inserts the handles but automatically supplies paint to the ends of the handles and into the openings for the purpose described above, and for the accomplishment of this added result I provide on the rear of the machine a receptacle 42 for the paint. In the receptacle is a pump comprising a cylinder block 43 having four cylinder openings arranged vertically, and four plungers 44 adapted to be actuated on each stroke of the handle setting blade, these plungers in this instance being connected by a block in the form of a link 45 to the equivalent of a bell-crank 46 supported at 47 (see Fig. 3) for rocking movement on the two rear columns 17, this bell-crank having a forwardly projecting arm provided with a roller 48 adapted to be engaged by an actuating member, in this instance in the form of a cam plate or strip 49, having its lower end beveled, as shown, and attached to the rear side of the cam plate 24. As the cam plate 24 descends with the handle setting blade 21, the bell-crank is rocked so as to give a downward stroke to the pump plungers 44, and on the up stroke of the blade and cam plate, a spring 50 elevates the pump plungers.

The pump cylinders 44 have intake openings 51 and the lower parts of the cylinders have connected to them outlet pipes 52, and to two of these pipes are suitably connected a pair of tubes or pipes 53 which deliver the liquid or paint to the openings of the case or box into which the handles are to be inserted. To the other two pipes 52 are connected flexible pipes or tubes 54 which are connected to the outer ends of the positively actuated slides 35, the latter having ducts 55 extending through them, as clearly shown in Fig. 6. The delivery tubes or pipes 53 extend through the central guide slide 40 of the cam plate and through the back plate 12 as indicated in Fig. 4, their forward or delivery ends being at the front face of the back plate immediately above the openings of the case into which the ends of the handle are to be inserted. The flexible tubes or pipes 54 extend from the receptacle 42 to both sides of the machine, and are connected to the slides, as indicated in Figs. 1, 2 and 6.

The parts are so disposed that as the blade descends, forcing the handle downward, small quantities of the liquid are forced through the slides 35 onto the ends of the handle, and through the tubes 53 into the openings of the case just before the ends of the handle are driven into them.

The above machine can be operated with considerable rapidity, it being only necessary for the operator to place the boxes or cases in position and to actuate the valve which moves the handle setting blade. The rapidity with which the handles can be inserted results in a decreased expense in equipping the boxes or cases with handles, and better and more uniform results are obtained since all the handles are set to the same position, and lack of uniformity as when the handles are pounded downward by hand is avoided.

Having described my invention, I claim:

1. In a machine for inserting handles into openings in boxes or cases, a support for the latter, a device for supplying the handles, and a plunger engageable with the handles to force the same into openings of the boxes.

2. In a machine for inserting handles into openings in boxes or cases, a handle setting plunger for driving handles into the boxes, means for guiding the handles as the same are being moved by the plunger, and means for supporting the boxes with the openings aligned with said guiding means.

3. In a machine of the character described, a handle setting plunger for driving handles into boxes, and means for guiding the handles to openings in the boxes as the handles are being moved by the plunger, the guiding means comprising slides.

4. In a machine of the character described, a handle setting plunger for driving handles into boxes, and means for guiding the handles to openings in the boxes as the handles are being moved by the plunger, the guide means comprising a stationary part and a pair of slides on opposite sides thereof and movable toward and away from the same.

5. In a machine of the character described, a handle setting plunger for driving handles into boxes, and means for guiding the handles to openings in the boxes as the handles are being moved by the plunger, the guide means comprising a stationary part onto which the top part of the handle is adapted to be driven by the plunger and two positively actuated slides on opposite sides of the stationary part.

6. In a machine of the character described, a support for boxes to be equipped with wire handles, a plunger for driving the handles, one at a time, a handle delivery member having its delivery end adjacent the path of movement of the plunger, a pair of slides for supporting the innermost handle independently of the handle delivery member directly beneath the plunger, and means beneath said slides for guiding the handle when the latter is forced past said slides by the plunger.

7. In a machine for setting wire handles into boxes, a support for the boxes, a plunger for driving the handles into the boxes, a handle delivery member for delivering the handles into the path of movement of the plunger, means comprising two sets of slides for supporting and guiding the handles, and means for positively actuating one of said sets of slides.

8. In a machine for inserting handles into openings in boxes or cases, a handle setting plunger for driving handles into the boxes, means for guiding the handles as the same are being moved by the plunger, a supporting means for the boxes with the openings alined with guiding means, and means for supplying a liquid to the openings before the handles are driven into said openings.

9. In a machine for inserting handles into openings in boxes or cases, a handle setting plunger for driving handles into the boxes, means for guiding the handles as the same are being moved by the plunger, a supporting means for the boxes with the openings alined with guiding means, and means for supplying a liquid to the handles before the handles are driven into said openings.

In testimony whereof, I hereunto affix my signature.

HENRY WEBB LORMOR.